United States Patent [19]
Read et al.

[11] Patent Number: 5,243,495
[45] Date of Patent: Sep. 7, 1993

[54] REMOVABLE ENCLOSURE HOUSING A RIGID DISK DRIVE

[75] Inventors: John D. Read, Monument, Colo.; Charles E. Vaillant, Hudson; Gordon J. Norquay, Charlton, both of Mass.

[73] Assignee: Digital Equipment Corporation, Maynard, Mass.

[21] Appl. No.: 856,006

[22] Filed: Mar. 20, 1992

[51] Int. Cl.$^5$ .......................... H05K 7/02; H05K 7/10
[52] U.S. Cl. ................................ 361/685; 360/97.01; 360/98.01; 361/739
[58] Field of Search .............. 360/97.01, 98.01; 220/4.02, 4.21, 4.24; 364/708; 174/35 R, 50; 361/380, 390, 391, 392, 393, 394, 395, 399, 424

[56] References Cited

U.S. PATENT DOCUMENTS

| | | | |
|---|---|---|---|
| 4,089,464 | 5/1978 | Teti, Jr. et al. | 220/4.21 X |
| 4,567,317 | 1/1986 | Ehrlich et al. | 174/35 R X |
| 4,639,863 | 1/1987 | Harrison et al. | |
| 4,652,969 | 3/1987 | Stegenga | 220/4.24 X |
| 4,754,397 | 6/1988 | Varaiya et al. | 360/97.01 X |
| 4,780,570 | 10/1988 | Chuck | 361/424 X |
| 4,825,316 | 4/1989 | Kishi et al. | |
| 4,908,715 | 3/1990 | Krum et al. | |
| 4,912,580 | 5/1990 | Hanson | |
| 4,926,365 | 5/1990 | Hsieh | 364/708 |
| 4,930,029 | 5/1990 | Morita | |
| 4,941,841 | 7/1990 | Darden et al. | 364/708 X |
| 4,965,684 | 10/1990 | Stefansky | |
| 5,021,905 | 6/1991 | Sleger | 360/97.01 X |
| 5,025,335 | 6/1991 | Stefansky | 360/97.01 |
| 5,025,336 | 6/1991 | Morehouse et al. | 360/97.01 X |
| 5,027,242 | 6/1991 | Nishida et al. | 360/97.01 X |
| 5,122,914 | 6/1992 | Hanson | 361/393 X |
| 5,126,954 | 6/1992 | Morita | 364/708 |
| 5,140,108 | 8/1992 | Miyajima | 220/4.02 X |
| 5,142,447 | 8/1992 | Cooke et al. | 361/394 |

OTHER PUBLICATIONS

Draft Proposed American National Standard, for "ATA (AT attachment)" Rev. 3.0, X3.221 199X, X3 Secretariat/CBEM, Washington, D.C. Feb. 10, 1992.
American National Standard for information systems-small computer system interface (SCSI)ANSI X3.131-1986 ANSI Inc., NY, NY.

Primary Examiner—Leo P. Picard
Assistant Examiner—Michael W. Phillips
Attorney, Agent, or Firm—Barry N. Young; Ronald C. Hudgens; Dirk Brinkman

[57] ABSTRACT

A removable self-contained rigid disk drive has a head and disk assembly (HDA) and controller enclosed by a top and bottom cover. The industry standard form factor drive is externally dimensioned to be removably installable in a disk bay of the same form factor. HDA components are mounted on one side a composite plastic-steel base, and the controller is attached to the other side. The controller is proved with an industry standard electrical interface for connecting the drive with a host computer system with a complementary electrical interface. The covers of the drive are made of metal to reduce electromagnetic interference when the drive is in operation.

4 Claims, 3 Drawing Sheets

REMOVABLE ENCLOSURE HOUSING A RIGID DISK DRIVE

FIELD OF THE INVENTION

This invention relates to rigid disk drives utilized in computer systems, and more particularly to rigid disk drives which have increased capacity, reduced size and weight, and which are user removable from the computer system.

BACKGROUND OF THE INVENTION

It is desirable to provide for the removability of a rigid or hard disk drive from a computer system by the computer user. There is also a need for such disk drives to be of a reduced size, weight, increased information storage capacity, and dimensioned according to a predetermined industry standard or "form factor," and yet be of a lower cost to be competitive with drives using disposable recording media such as floppy diskettes, disk cartridges, and magnetic tapes.

Drives using removable storage media, such as floppies, cartridges, and tapes are frequently used by computer user for: interchanging information between computer systems; preserving security in the information; and long term archiving. Although removable media are relatively inexpensive, they are subject to certain disadvantages.

Drives using removable storage media generally give reduced performance, capacity, and reliability when compared with rigid or hard disk drives. As form factors have been dramatically reduced, the mass and size of key components in rigid disk drives have likewise been reduced. Such reduction in size has allowed the concept of removable rigid disk storage to be redressed. Accordingly, the manufactures of computer systems and disk drives have provided for rigid disks which are removable from the computer system in which they are used.

According to the prior art, there are three types of rigid removable disk devices available, excluding traditional floppies and tape. These include: rigid disks encased within a removable cartridge, plug compatible external disk drives configured as "side-cars", and rigid disk drives removable from a specially adapted external mounting frame installed in a disk bay of a computer.

With respect to rigid disk cartridges, as with any separately removable media, head positioning and alignment errors become very significant and ultimately limiting factors to storage density or capacity. Also the registration of disk to spindle after cartridge insertion adds additional error and also limits the areal density. Both factors also directly effect performance and cost. To ensure reliability of the media in the cartridge, complex purge and seal systems are required to prevent media and head failure caused by contaminants introduced during removal and reinsertion of the cartridge in the drive. For all of these reasons, known disk cartridges do not present an ideal removable rigid disk storage device for the computer user.

External rigid disk drives or side-car drives may be considered a removable storage device, since the drive can easily be unplugged from the computer by the user. The known external drives tend to be bulky, and of necessity require cabling and compatible plugs on both the computer and the cable which decrease reliability. Furthermore, side-car drives present an awkward balancing problem to the laptop or notebook computer user, and are only negligibly amenable to pocket stuffing.

The various forms of removable media considered up to this point are often confused with true removable drives, that is a disk storage device where the total drive mechanism is removed from the host environment. To date, all of the known removable rigid or hard disk drives consist of traditional drive units packaged within an additional set of exterior mechanics, or mounting frames, to allow their removability. That is, the mounting frame generally increases the size of the overall unit. For example, a 3½" disk drive is generally removably mounted in an exterior frame fitted into a 5¼" form factor disk bay in a computer. Likewise, known 2½" drives, generally require external frames sized to fit in 3½" disk bays.

Additional electrical interconnects are generally required at a reduction in overall reliability. The traditional drives contained in such units have not been specifically designed to operate within the portable environment, but are merely adapted to portability after the fact. As such, their ability to survive in such applications is dependent on a variety of factors. The additional packaging required adds costs, weight, complexity, and aggravates thermal problems.

The success of known exterior packaging varies greatly. While the packaged drives are much more rugged than their non-packaged versions, none offer the protection normally obtainable with price competitive removable media. In addition, the prerequisite exterior mounting frame increases the physical size of the unit to the extent that it is only marginally adaptable to the laptop, and generally entirely excluding the needs of the growing notebook-sized computer user.

There is consequently a significant need for a reduced size rigid disk drive which is self-contained, and removable from the host computer by a user.

SUMMARY OF THE INVENTION

In accordance with the present invention, there is provided a removable rigid disk drive. The drive which is fully integrated and self-contained, includes a head and disk assembly ("HDA") and controller enclosed by a top and bottom cover. The industry standard form factor drive is externally dimensioned to be removably installable in a disk bay of the same form factor. HDA components are mounted on one side of a composite plastic-steel mounting base, and the controller is attached to the other side. The controller is proved with an industry standard electrical interface for connecting the drive with the disk drive data and control circuits of a host computer system with a complementary electrical interface. The covers of the drive are made of metal to reduce electromagnetic interference when the drive is in operation.

DESCRIPTION OF THE PREFERRED EMBODIMENT

The rigid removable disk drive as described herein includes, for example, a single hard disk with a magnetic coating for recording information and utilizing Winchester technology. However, the disk drive may, in alternative embodiments, utilize a plurality of disks, with a corresponding number of read/write heads, generally two heads per disk, one for each disk surface. Other types of disks, for example, optical disks, and other read/write technologies, for example, lasers, may also be used by the present invention.

The trend in disk storage devices is to provide higher information storage densities. The storage densities of disk drives have been increased by reducing the form factor, or industry standard dimensions of the drive, and by increasing the density of the bits on the recording surfaces. For example, eight inch (8") drives were followed by five and-quarter inch (5¼"), and then three and one-half inch (3½") drives. Portable computer systems such as lap-tops and notebook-sized computers have demanded further size reductions. Consequently, drives with a two and one-half inch (2½") form factor are now commonly used with these types of computers.

In accordance with these standardized sizes, computer systems have been designed with disk drive mounting bays internally dimensioned to be compatible with specific form factor drives. In other words, a 2½" disk drive can be mounted in any computer system having a 2½" disk bay. The inventors of the disk drive which is the subject of the present application realized that there is a need to have a disk drive of a given form factor which can be user removable, and yet is compatible with a disk bay of the same form factor.

By making the drive user removable, a computer end user can select a drive, at time of purchase, with performance and storage characteristics particularly suited to his needs and price range. Furthermore, should the user's requirements change over time, the drive can be "field upgraded," without the service of a technician, or the need to open and disassemble the computer enclosure. In addition, the low cost drive, according to the present invention, can eliminate the problem of serviceability by being essentially disposable. Furthermore, the portable drive, as disclosed herein, is fully compliant with federally regulated electromagnetic emission standards.

Designing a self-contained removable disk drive has presented the challenge of redesigning the arrangement of the drive components; for example, the head and disk assembly ("HDA"), the controller, and the drive enclosure.

Figure 1:
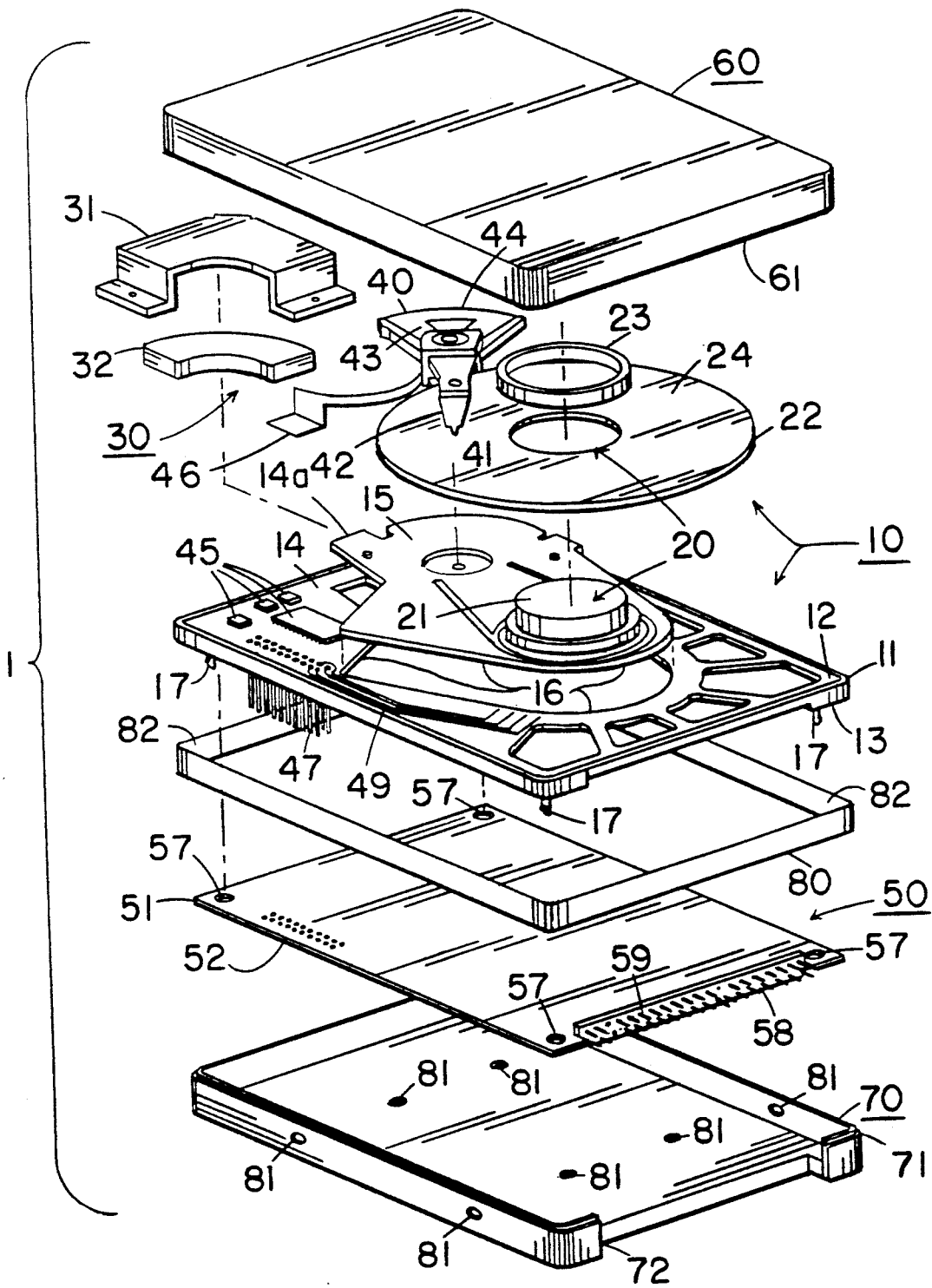
FIG. 1 is an exploded perspective view of the removable disk drive according to the present invention.
Figure 2:
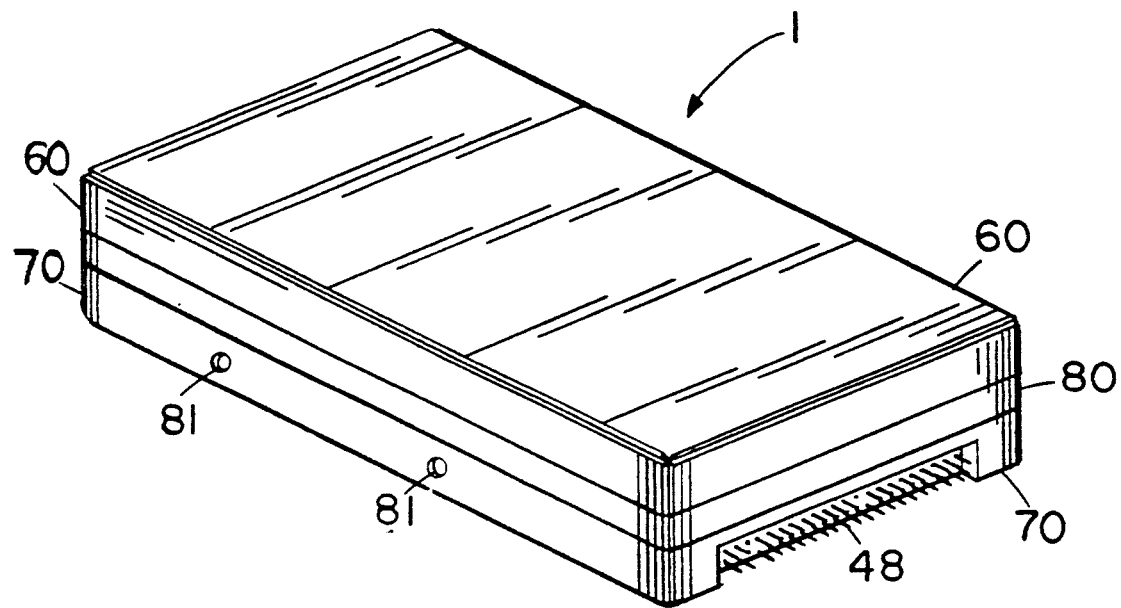
FIG. 2 is a perspective view of the disk drive of FIG. 1 assembled.

FIG. 1 shows an exploded view of a self-contained, removable disk drive 1, according to the principles of the invention, having an industry standard size or "form factor" and an industry standard externally accessible electrical interface. According to the present invention, the disk drive 1 comprises a head and disk assembly ("HDA") 10, a controller 50, and an enclosure having, for example, a top and bottom covers 60 and 70, respectively. The covers 60 and 70 enclose the HDA 10 and the controller 50 when the arrangement shown in FIG. 1 is fully assembled as shown in FIG. 2.

Now with specific reference to FIG. 1, the HDA 10 includes a rectangularly shaped mounting base 11 having a top surface 12 and a bottom surface 13. The baseplate 11 is formed of an exterior portion 14 having an irregularly shaped hole 14a therein, and an interior portion 15 shaped to fit the hole 14a. Extending vertically from the bottom surface 13, in each of the four corners of the exterior portion 14, are flexible snap tabs 17 adapted to engage with the controller 50. The exterior portion 14 is made of, for example, a weight reducing plastic molded to size. The plastic can be made of, for example, "ULTEM" made by the General Electric Company, Pittsfield, Mass. This type of plastic can be used with dip or infrared reflow soldering techniques to permit the placement of electrical circuit traces 49 directly on the top surface of the base 11, as will be further explained herein.

Mounted on the top surface 12 of the base 11, in the general area of the interior portion 15 are the disk assembly 20, the head assembly 30, and the read/write pre-amplifier circuits 45. The interior portion 15 is made of, for example, steel which is formed, such as by stamping, to size and shape. The interior steel portion 14 is attached to the exterior plastic interior portion 14 first by, for example, heat staking selected spots along the periphery of the portions 14 and 15 to fix the parts in place, and second by, for example, a semi-flexible adhesive 16 such as "LOCK-TITE 366" made by the Loctitle Corporation of Newington, Conn.

By making the base 11 as a plastic-steel composite, the base 11 has the combined advantage of being lightweight, and at the same time providing a rigid and rugged mounting base for the disk assembly 20 components. In addition, the semi-flexible bond provides shock damping for the components mounted on the interior portion 14.

The disk assembly 20 comprises a rotatably mounted spindle 21, a disk 22, and a clamping ring 23. The spindle 21 includes a conventional brushless DC motor, not shown, mounted inside the spindle shaft. The disk 22 is an industry standard 2½" (65 mm) disk, having a recording surface 24 on at least one side thereof. The disk 22 is securely clamped to the spindle 21 by a heat shrink clamping ring 23.

The head assembly 30 comprises a mounting bracket 31, a magnet 32, and a generally conventional head positioner assembly 40. The positioner assembly 40 is movably mounted for radially positioning a read/write head 41 mounted at the distal end of a positioner arm 42. A portion of the positioner assembly 40 is wrapped with copper wire to form a voice coil 43 which electro-magnetically interacts with the magnet 32 to position the head 41 relative to the various concentric data recording tracks on the recording surfaces 24 of the disk 22.

The electronic signals for the head 41 and the voice coil 43 are carried by a flexcircuit 46. Because of the relatively low mass of the positioner assembly 40 the mass of the flexcircuit 46 is of a major concern to ensure rapid and accurate positioning of the head 41 with minimal power usage. Therefore, the length of the flexcircuit 46 is reduced by mounting the preamplifier circuits 45 on the plastic exterior portion 14 of the base 11 relatively near to the positioner assembly 40. Also, to facilitate assembly of the drive, the electrical circuit traces 49 for interconnecting the electrical components of the HDA 10 are placed directly on the plastic portion 14 of the base 11. Using a process available from the UFE Corporation of Stillwater, Minn., traces 49, are placed on a thin film of "ULTEM", for example having a thickness of 5 mil. The film is then bonded to the plastic exterior portion 14 during the injection molding process used to form the exterior portion 14. The HDA 10 and the controller 50 are electrically coupled to each other by means of pins 47 extending from the bottom surface 13 of the base 11.

The controller 50 comprises a rectangularly shaped printed circuit board ("PCB") 51, approximately the same size as the base 11, having electronic components and circuits, not shown, mounted thereon. The PCB 51 is provided with throughholes 57 arranged and configured to engage with the snap-tabs 17 of the base 11. The electronic components and circuits of the controller 50 perform conventional functions such as: controlling spindle 21 velocity. positioning the head assembly 40, and transferring data to and from the recording surface 24 of the disk 22 by means of the read/write head 41.

An externally accessible electrical interface, for example I/O connector 58, having a plurality of pins 59 connected to the circuits of the controller 50, is mounted on one edge of the PCB 51. The I/O connector 58 is, for example, an industry standard IDE or ATA connector. That is, to comply with the IDE/ATA standard the pins 59 are arranged in two rows of 25 pins 59 each. The pins 59 are spaced 2 mm apart and are 0.5 mm square. Pins 59 in position 5,6 and 25 are removed for I/O connector 58 keying. It is to be understood that in alternative embodiments the controller 50 and I/O connector 58 can also be configured to be compatible with other industry I/O interfaces, for example, SCSI, or the like.

Now also with reference to FIG. 2, the enclosure for the HDA 10 and controller 50 is formed of top cover 60, and a bottom cover 70. The bottom cover 70 has a cut-out 72 dimensioned and arranged to provide access to the I/O connector 58. The covers 60 and 70 can be attached to each other by conventional fastener means, by way of example, an adhesive sealing tape 80 for environmentally sealing the air space enclosed. Since the low-cost disk drive 1 of the present invention is made non-repairable, that is disposable on failure, the covers can also be, for example permanently attached to each other.

The covers 60 and 70 of the enclosure of the drive 1 can be made of plastic, or where there is a requirement to provide electromagnetic interference ("EMI") shielding the covers 60 and 70 are made of an electrically conductive metal, for example steel, to provide a Faraday cage for the HDA 10 and controller 50 contained therein. In the later case, the tape 80 can be made of an adhesively backed copper strip the adhesive on the tape 80, generally indicated by reference numeral 82, to provide continuity in the EMI shield provided by the metal covers 60 and 70.

Although the disk drive 1 as described herein is designed to be removably mounted in a computer system, in order to be compatible with 2½" form factor standards, and as is shown in FIGS. 1 and 2, the bottom cover 70 of the enclosure is provided with threaded screwholes 81 for permanently mounting the drive in a disk bay of a computer chassis.

The external dimensions of the 2½" inch drive as shown in FIG. 2 are as follows. The drive has a length of 4.00 inches, a width of 2.75 inches. The height of the drive is typically dependent on the numbers of disks used in the HDA 10. For a drive with a single 2½" disk the height is, for example, generally 15 mm. Alternative heights permitted for drives with multiple disks include, for example, 19.0 mm or 25.4 mm.

Figure 3:
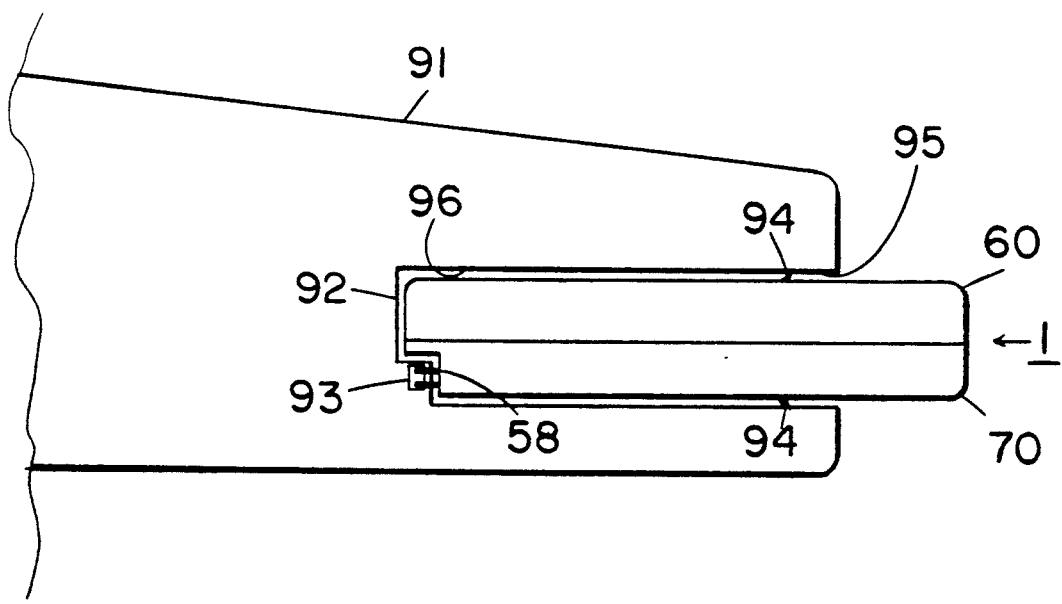
FIG. 3 is a cross-sectional view, partially broken away, of the drive of FIG. 1 installed in a disk bay of a computer system.

Now with reference to FIG. 3, the 2½" removable disk drive 1, according to the present invention is shown installed in a disk bay 90 of a computer 91. The computer 91 can be, for example, a laptop or notebook-sized computer having data and control circuits for the disk drive 1. The disk bay 90, having a generally rectangular mouth 95, is sized to conform to the external dimensions of the drive 1. That is the form factor of the disk bay 90 is the same as the form factor of the disk drive 1, for example 2½".

The rear portion 92 of the disk bay 90 includes an electrical interface connected to the data and control circuits of the computer 91, for example an industry standard IDE or ATA plug 93, to electrically mate with the I/O connector 58 of the drive 1. The disk bay 90 in the area near the mouth 95 is equipped with flexible electrically conductive protrusions 94, for example wire brushes or copper fingers, to provide electromagnetic continuity in the air space between the drive 1 and the interior walls of the bay 90 for EMI shielding purposes when the drive 1 is installed and operational in the computer 91.

To operate the disk drive 1 in the computer 91 the user simply inserts the drive 1 in the mouth 95 of the disk bay 90 until the two complementary I/O interfaces 58 and 93 are engaged with each other making the disk drive 1 operable. To remove the drive 1 from the computer 91 so that it may be transported, the user simple pulls the drive 1 out of the bay 90 disengaging the I/O interfaces 58 and 93.

While there has been shown and described a preferred embodiment, it is to be understood that various other adaptations and modifications may be made within the spirit and scope of the invention.

What is claimed is:

1. A rigid disk drive, removable form a disk bay of a computer system by a user, the disk bay dimensioned to a form factor that predetermines the length, width and height of the drive, comprising:
   - a mounting base having a disk and head assembly (HDA) mounted on one side thereof, said HDA including at least one rotatably mounted disk for storing information and at least one movably mounted read/write head for accessing stored information; said mounting base having an exterior portion having a hole therein and an interior portion shaped to fit said hole in said exterior portion, said exterior portion having said interior portion fitted therein to form said mounting base, and said HDA mounted on said interior portion;
   - a controller mounted on the opposite side of said mounting base, said controller having an electrical interface accessible for connecting said controller with the computer system; and
   - an enclosure containing said HDA and controller, said enclosure externally dimensioned to the predetermined form factor of the disk bay of the computer system.

2. The disk drive as in claim 1 wherein said exterior and interior portions are attached to each other by a resilient adhesive.

3. The disk drive as in claim 1 wherein said exterior portion is made of a plastic and said interior portion is made of metal.

4. The disk drive as in claim 1 wherein said exterior portion includes electrical circuit traces.

* * * * *